Figure 1:
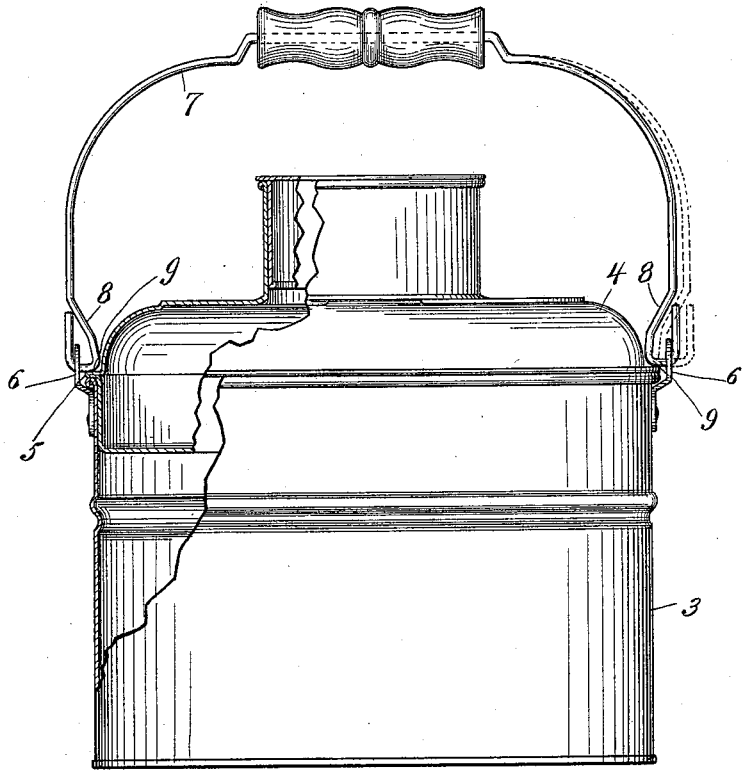

(No Model.)

S. WALTER.
COVER LOCKING HANDLE FOR PAILS.

No. 599,082. Patented Feb. 15, 1898.

Witnesses.
O. N. Keeney.
Anna V. Faust.

Inventor.
Sebastian Walter.
By Benedict & Morsell
Attorneys.

UNITED STATES PATENT OFFICE.

SEBASTIAN WALTER, OF MILWAUKEE, WISCONSIN, ASSIGNOR TO THE KIECKHEFER BROTHERS COMPANY, OF SAME PLACE.

COVER-LOCKING HANDLE FOR PAILS.

SPECIFICATION forming part of Letters Patent No. 599,082, dated February 15, 1898.

Application filed June 28, 1897. Serial No. 642,561. (No model.)

*To all whom it may concern:*

Be it known that I, SEBASTIAN WALTER, of Milwaukee, in the county of Milwaukee and State of Wisconsin, have invented a new and useful Improvement in Cover-Locking Handles for Pails, of which the following is a description, reference being had to the accompanying drawings, which are a part of this specification.

My invention has relation to improvements in cover-locking handles for pails.

The object of the invention is to provide, in connection with pails employing removable covers, a swinging handle or bail so constructed as to act as a lock to the cover no matter to what position the handle may be adjusted, to thereby maintain the cover in closed position against accidental detachment. In the usual form of handles composed of a wire bail the ends of the wire are extended in a straight line to the lugs or ears and passed through the perforations of said lugs or ears and then bent upwardly to form loops to prevent the handle from being disconnected at its ends.

One of the principal features and objects of my invention is to provide a peculiar formation at the extremities of the wire handle or bail, so that when the cover is being adjusted to place or fitted to the receptacle it will be automatically locked in closed position.

With the above and other objects in view the invention consists of the devices and parts or their equivalents, as hereinafter more fully set forth.

In the drawings I have shown my improvements as applied to a workman's dinner-pail. It will be understood, however, that the invention is equally applicable to kettles, tea-urns, coffee-pots, and other vessels employing removable lids.

Figure 2:
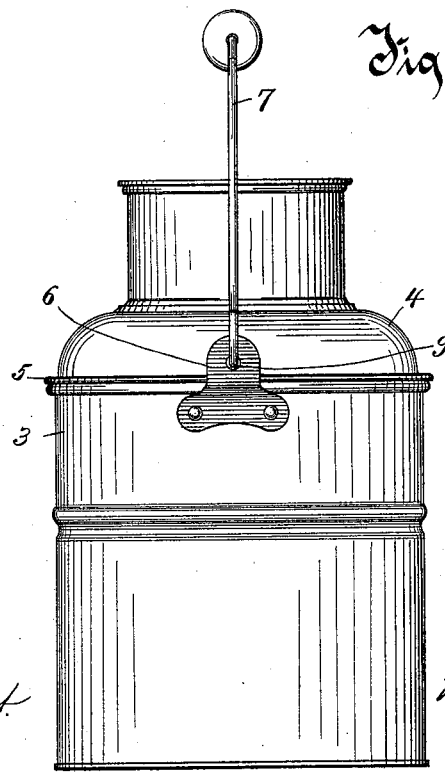

In the accompanying drawings, Figure 1 is an elevation of a dinner-pail, showing my improvements applied thereto; and Fig. 2 is a view at right angles to Fig. 1.

Referring to the drawings, the numeral 3 indicates an ordinary form of dinner-pail, provided with the removable-top coffee-reservoir 4, which forms the cover of the pail. This reservoir is provided with the usual outer flange 5, which overlaps the upper edge of the pail. At its upper end the pail has secured thereto at opposite points the upwardly-extending apertured lugs or ears 6 6.

The handle or bail is indicated by the numeral 7. Near its extremities it is provided with the inwardly-slanting portions 8 8, and from the lower ends of said inwardly-slanting portions it is bent outwardly in horizontal lines and passed through the apertures of the lugs or ears, forming shoulders 9 9. The extremities are finally bent in a straight line at right angles to the horizontal portions to form loops to prevent disconnecting the ends of the handle from the perforated ears.

In the operation of the invention when it is desired to adjust the cover to a closed position the handle is raised to a vertical position and the cover inserted between the sides of the handle or bail. The cover is then pressed downwardly and the ends of the flanges 5 are caused to act against the inwardly-slanting portions 8 of the bail or handle. This will cause the looped ends of the handle to be forced outwardly and allow the ends of the flange to clear the inwardly-slanting portions 8 and to be forced down below the shoulders 9. The moment the ends of the flange are clear of the slanting portions of the handle the spring character of the wire or bail composing the handle will tend to spring the looped ends of the handle inwardly and to bring the shoulders 9 above the flange 5, thereby automatically locking the cover in closed position. It is obvious that the horizontal portions 9 forming the shoulders have limited play in the apertures of the lugs or ears 6, and consequently admit of a slight inward-and-outward play of the looped ends of the handle, so as to provide for the outward-and-inward springing of the looped ends, as just referred to, whereby the automatic locking is effected.

When it is desired to remove the cover, all that is necessary is to grasp one side of the handle or bail and pull the looped extremity outwardly, as indicated by dotted lines in Fig. 1, until the horizontal shoulder 9 is clear of the end of the flange 5. This end of the cover, therefore, is free to be pulled upwardly, when of course the entire cover can be readily removed.

From the above description it is thought that the advantages of my improvements will be readily appreciated. When the invention is applied to dinner-pails ordinarily used by workmen, it affords a most secure fastening for maintaining the coffee-reservoir constituting the cover in closed position and preventing its accidental displacement and release, which might occur from jolting or other causes. When used in connection with kettles, tea-urns, coffee-pots, and various other kinds of vessels employing removable covers and having spouts for the discharge of the contents, the vessel can be readily tilted for the exit of the liquid through the spout without danger of the cover becoming detached.

The great advantage of my invention resides in the fact that while it affords a secure locking device for the cover, yet it requires no additional manipulation whatever in adjusting the cover to place over the ordinary method of covering a receptacle with its lid.

While I have shown the pivot portions 9 of the loops as passing outwardly through the ears or bearings, and thence finally bent upwardly on the outside of said ears or bearings, still I do not wish to be understood as restricting myself to this particular arrangement, inasmuch as it is obvious that the handle or bail could be extended downwardly adjacent to the outside of the ears or bearings and thence the pivotal portions 9 of the loop extended inwardly through the ears or bearings and the terminals of the loop bent at inclines similar to the inclines 8. It is evident that this is no departure from the spirit and scope of my invention.

What I claim as my invention is—

1. In a cover-locking handle for pails, and like vessels, the combination, of a pail having bearings secured thereto, a removable cover for the pail, the bearings of the pail projecting above the rim of the cover, and an elastic handle or bail having its lower ends provided with inwardly-inclined portions arranged on the inner sides of the bearings and above the rim of the cover, said inclined portions joining horizontal or substantially horizontal portions of the bail, which portions form pivots which are journaled in the bearings and are laterally movable therein, said pivots also forming shoulders, the inwardly-inclined portions of the bail constructed to be acted upon by the rim of the cover, when said cover is being inserted in place, whereby the pivoted ends of the bail are sprung outwardly to permit the rim of the cover to clear the shoulders of the pivots, and said pivoted ends of the bail automatically springing inwardly to permit the shoulders to engage the rim and retain the cover in place.

2. In a cover-locking handle for pails, and like vessels, the combination, of a pail having bearings secured thereto, a removable cover for the pail, the bearings of the pail projecting above the rim of the cover, and an elastic handle or bail having its lower ends provided with inwardly-inclined portions arranged on the inner sides of the bearings and above the rim of the cover, said inclined portions joining horizontal or substantially horizontal portions of the bail, which portions form pivots which are journaled in the bearings and are laterally movable therein, said pivots also forming shoulders, the inwardly-inclined portions of the bail constructed to be acted upon by the rim of the cover, when said cover is being inserted in place, whereby the pivoted ends of the bail are sprung outwardly to permit the rim of the cover to clear the shoulders of the pivots, and said pivoted ends of the bail automatically springing inwardly to permit the shoulders to engage the rim and retain the cover in place, said shoulders engaging the rim of the cover, in all positions to which the bail may be turned, when said bail is not sprung outwardly.

3. In a cover-locking handle for pails, and like vessels, the combination, of a pail having bearings secured thereto, a removable cover for the pail, the bearings of the pail projecting above the rim of the cover, and an elastic handle or bail having its ends formed into loops, the inner sides of the loops being on an incline toward the cover, and the lower horizontal or substantially horizontal portions of the loops forming pivots which engage and are laterally movable in the bearings, said pivots also forming shoulders, the inwardly-inclined portions of the loops being constructed to be acted upon by the rim of the cover, when said cover is being inserted in place, whereby the pivots of the loop are sprung outwardly to permit the rim of the cover to clear the shoulders, and said pivots of the loops adapted to automatically spring inwardly to permit the shoulders to engage the rim, and retain the cover, when said cover is finally adjusted to place.

In testimony whereof I affix my signature in presence of two witnesses.

SEBASTIAN WALTER.

Witnesses:
ARTHUR ARNDT,
EMIL H. WINTER.